Figure 1:
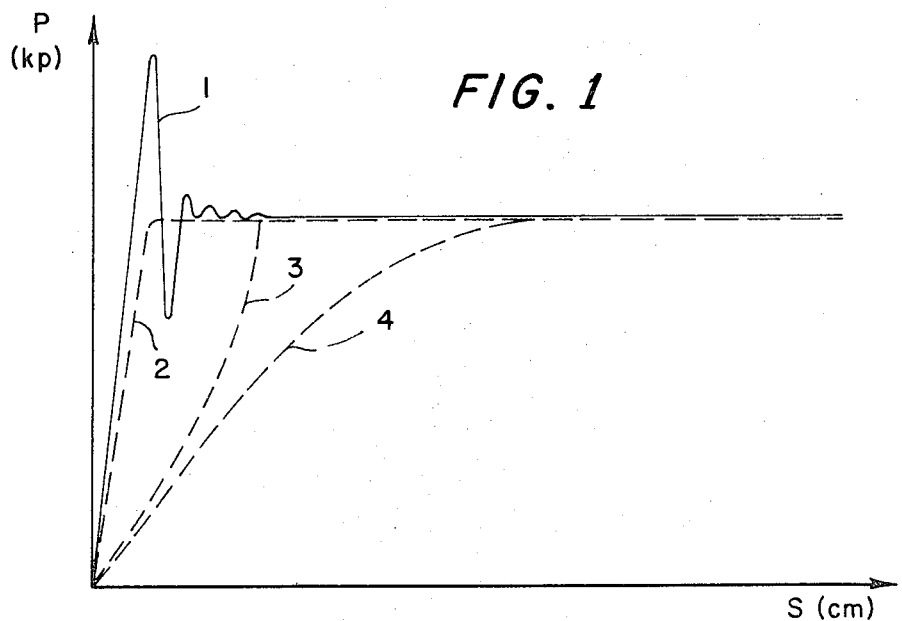

United States Patent
Radimirsch et al.

[15] 3,682,463
[45] Aug. 8, 1972

[54] PROGRESSIVELY-ACTING SHOCK ABSORBER ELEMENT

[72] Inventors: Karl Radimirsch, Meersburg; Dietrich Schwarz, Friedrichshafen, both of Germany

[73] Assignee: Dornier System G.m.b.H., Friedrichshafen/Bodensee, Germany

[22] Filed: July 21, 1970

[21] Appl. No.: 56,775

[30] Foreign Application Priority Data

Aug. 16, 1969 Germany..........P 19 41 600.3

[52] U.S. Cl. ..........................................267/63, 188/1
[51] Int. Cl. ..............................................F16f 1/36
[58] Field of Search.....267/183, 63, 64, 65; 188/1 C; 244/104

[56] References Cited

UNITED STATES PATENTS 3,169,758  2/1965  Dillenburger............267/64 R
3,552,525  1/1971  Schudel..................188/001 C

*Primary Examiner*—James B. Marbert
*Attorney*—James E. Bryan

[57] ABSTRACT

This invention relates to a progressively-acting shock absorber element comprising a structure which encloses cavities, such as honeycombs, tubes, and microspheres, a planar surface on said structure, and a progressively-acting load-introducing means mounted adjacent said surface and adapted to compress said structure upon the application of a load.

8 Claims, 5 Drawing Figures

PATENTED AUG 8 1972 3,682,463

SHEET 1 OF 2

INVENTORS
KARL RADIMIRSCH
DIETRICH SCHWARZ

James E. Bryan
ATTORNEY

PROGRESSIVELY-ACTING SHOCK ABSORBER ELEMENT

This invention relates to a progressively-acting shock absorber element having a structure which encloses cavities such, for example, as honeycombs, tubes, or microspheres.

The problem of shock absorption here involved is particularly the absorption of peak forces, which arise in operation, by means of expendable elements which are used only once and then are replaced for the next use. Known in the art are shock absorbing problems of this type in connection with the landing skids of helicopters, in which case the normal landing shocks are absorbed by an elastic deformation of the landing skids, whereas an excessive stress is absorbed by a plastic deformation of interposed shock absorber elements without the elements themselves actually breaking. It also is known to employ honeycomb structures for these purposes, which have the disadvantage, however, that the force-path diagram at the beginning of the load shows a steep rise in conjunction with a high load peak which, in turn, has the result that the high load peak initially must be exceeded before the entire structure of the shock absorbing element can become effective.

In connection with the first known possibility mentioned above of the preliminary treatment of the honeycombs, a preliminary compression occurs prior to their installation by means of applying a load to the honeycomb structure, whereby the load peak is already exceeded. The disadvantage of this is that the final energy absorption capacity is thereby already reduced. The second possibility mentioned above, according to which the honeycomb is provided with a profiled surface, in pyramidal shape for example, and in which the cross-section gradually reaches the end measure inasmuch as the deformation begins from the surface at all times, has the disadvantage that each honeycomb block requires a specific expensive design or shaping and, accordingly, requires manufacture by means of expensive tools.

The present invention begins with the second possibility outlined above and provides a way for preventing the drawbacks and disadvantages indicated and for rendering it possible to break up the load peak and to achieve a softer or more gradual rise of the force-path diagram. This is accomplished in accordance with the present invention by virtue of the fact that the structure enclosing the cavities has a planar surface while the load-introducing member is shaped in conformity with the desired law of progressiveness, for example pyramidal or spherical, i.e., calotte-shaped.

The advantage afforded by the profiling of the load-introducing member which rests upon the planar surface of the structure enclosing the cavities is that the profiling may be exactly determined in advance and manufactured according to the desired use thereof, and that the specific shaping and profiling need not be taken into account for each honeycomb structure and each shock absorber element.

According to a further embodiment of the present invention, the shape of the load-introducing member is approximated by means of a stepped layering of planar sheets. This affords the advantage that the introduction of the load will occur at all times at a right angle with regard to the respective contact surface of the shock absorber element. Moreover, shock absorber elements of different structure, for example of varying honeycomb thickness, may be constructed in layers in which case the individual structures are maintained separate from each other by means of rigid thin sheets so as to prevent a mutual penetration of the structures. The sheets, in turn, may be provided on one side or on both sides thereof with profiles in order to control the behavior of this succeeding element. Profiled load-introducing members also may be positioned not only on one side but on both sides of such a shock absorber element, in which case one of the load-introducing members may be constructed as a rigid or stationary abutment. In this manner, it is possible to additionally vary the degree of progressiveness, if necessary.

Such progressively-acting shock absorber elements may be used because of their easy installation and disassembly possibilities in aircraft shock absorbing struts, landing stilts, towing rods, buffers, in the packing of sensitive equipment, for damping dropping plates, and the like.

Figure 2:
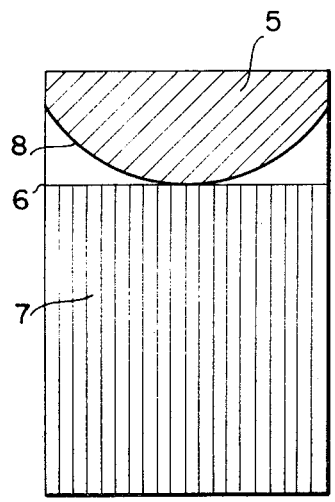
Figure 3:
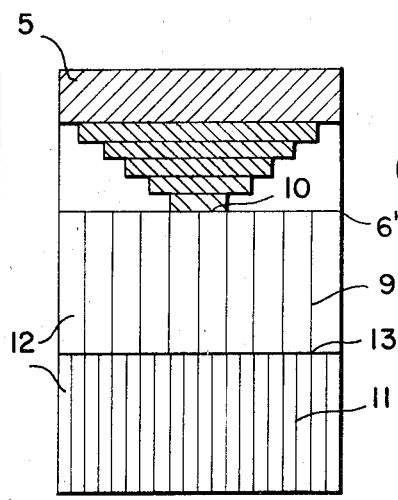
Figure 4:
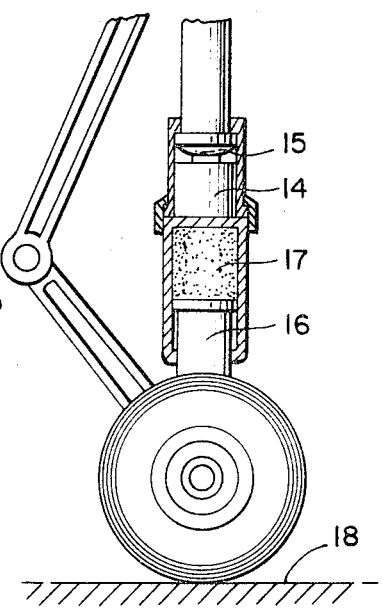
Figure 2A:
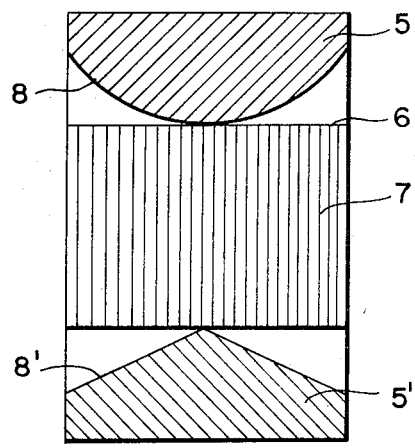

One embodiment of the invention will be further illustrated by reference to the accompanying drawings in which FIG. 1 is a force path-diagram for different types of shock absorber elements, FIG. 2 schematically illustrates the contact between the spherical, i.e., calotte-shaped, profiling of the load-introducing member and the planar surface of a shock absorber element, FIG. 2a illustrates a shock absorber element including load-introducing members at both ends, FIG. 3 illustrates a load-introducing member having a step-like profiling, and FIG. 4 illustrates an aircraft shock absorber strut with the shock absorber element inserted therein.

The force-path diagrams and the characteristic curves illustrated in FIG. 1 show the force-path course or extension such as it appears, for example, in case a load is exerted in the direction of the cell axis in different types of constructions of shock absorber elements having a honeycomb structure. While the characteristic curve 1 indicates the force-path course for an unprofiled shock absorber element, the characteristic curve 2 shows the course for a stepped construction, the characteristic curve 3 shows, for example, that of a conical and a pyramidal construction, and characteristic curve 4 shows that for a parabolic and spherical, i.e., calotte-shaped, profiling of the contact surface of the load-introducing member.

The load peak which is shown in and apparent from the characteristic curve 1 is based on the critical deformation and buckling load at the beginning of the plastic deformation of the interconnected cellular walls. After this critical deformation and buckling load has been exceeded, a continuous deformation operation at a practically constant load is initiated which, for example in the case of aluminum and paper honeycombs, leads to a progressive folding together and, in the case of cellular walls of glass fiber-reinforced plastics, leads to progressive breakage and pulverization. At that time, destruction occurs for the first time at one of the two contact surfaces between which the material is compressed.

In the characteristic curves 2,3, and 4, on the other hand, the disturbing load peak has been eliminated and adapted to the ideal characteristic curve by virtue of the fact that the load-introducing member and the contact surface thereof has been shaped, with respect to the planar surface of the shock absorber element, in conformity with the desired law of progressiveness.

FIGS. 2 and 3 illustrate such a shaping or design of the load-introducing member 5 in schematic form. While FIG. 2 shows the contact between the planar surface 6 of the shock absorber element 7 and the parabolically curved surface 8 of the load-introducing member 5 mounted thereover, the contact between the planar surface 6' of a more coarsely or wider screened shock absorber element 9 and the smaller surface 10 of the stepped profiled load-introducing member 5 being mounted thereover are shown in FIG. 3. In this case, the coarsely screened or wider screened shock absorber element 9 is mounted above an element 11 of this type having a finer screen of greater pressure resistance. The screen cross-section 12 and/or the structure of the two shock absorber elements 9 and 11 may be constructed, for example, in honeycomb fashion or tubular. It also is possible that several such structural elements 9 and 11 are superimposed with respect to each other and are separated from each other by means of rigid thin sheets 13.

In the construction of the load-introducing member 5 shown in FIGS. 2 and 3, the loading surfaces 8 and 10 thereof, respectively, increase gradually until they attain the desired constant deformation load, whereby a softer or more gradual rise of the force-path diagram is obtained without the occurrence of a load peak.

FIG. 2a illustrates a shock absorber element including load-introducing members at both ends. The load-introducing members 5 and 5' are provided on both sides of the honeycomb structure 7. The load-introducing member 5 has again, as in FIG. 2, a spherical or calotte-shaped surface 8, whereas the load-introducing member 5' has a conical surface 8'.

FIG. 4 illustrates a practical example for the use of a shock absorber element 14 with a load-introducing member 15 in an aircraft shock absorber strut 16. If the shock absorber strut 16 and the normal shock absorber device 17 are excessively stressed, in case of a hard landing or touchdown of the aircraft on a runway 18, the overstress arising as a result is transmitted to the built-in shock absorber element 14. This deformed and thereafter unusable element 14 then must be replaced by a new one, which can be accomplished by means of the easy disassembly thereof at the shock absorber strut.

It will be obvious to those skilled in the art that many modifications may be made within the scope of the present invention without departing from the spirit thereof, and the invention includes all such modifications.

What is claimed is:

1. A progressively-acting shock absorber element comprising a structure which encloses cavities, such as honeycombs, tubes, and microspheres, a planar surface on said structure, and a progressively-acting load-introducing means mounted adjacent said surface and adapted to compress said structure upon the application of a load.

2. A shock absorber element according to claim 1 in which the load-introducing means has a pyramidal shape.

3. A shock absorber element according to claim 1 in which the load-introducing means has a spherical shape.

4. A shock absorber element according to claim 1 in which the desired shape of the load-introducing means is approximated by a stepped layering of planar sheets.

5. A shock absorber element according to claim 1 in which the structure which encloses cavities is constructed in at least two different parts with separating means therebetween.

6. A shock absorber element according to claim 5 in which the separating means is a plate profiled on at least one side thereof.

7. A shock absorber element according to claim 5 in which the two different parts are honeycombs of varying thickness.

8. A shock absorber element according to claim 1 including load-introducing means at both ends of the structure which encloses cavities.

* * * * *